United States Patent [19]

Ota et al.

[11] Patent Number: 4,705,762
[45] Date of Patent: Nov. 10, 1987

[54] PROCESS FOR PRODUCING ULTRA-FINE CERAMIC PARTICLES

[75] Inventors: Kazuhide Ota, Okazaki; Susumu Abe, Toyota, both of Japan

[73] Assignee: Toyota Jidosha Kabushiki Kaisha, Toyota, Japan

[21] Appl. No.: 699,909

[22] Filed: Feb. 8, 1985

[30] Foreign Application Priority Data

Feb. 9, 1984 [JP] Japan .................................. 59-22463
May 29, 1984 [JP] Japan ................................. 59-109108

[51] Int. Cl.$^4$ ...................... C04B 35/02; C01B 13/14
[52] U.S. Cl. ...................................... 501/87; 423/335;
423/608; 423/610; 423/625; 423/633; 423/636;
501/96; 501/108; 501/127; 501/133; 501/134;
501/153; 501/154
[58] Field of Search ............... 423/DIG. 10, 335, 439,
423/625, 636, 610, 608, 633, 412, 409, 411;
501/1, 87, 96, 108, 127, 133, 134, 153, 154

[56] References Cited

U.S. PATENT DOCUMENTS

| | | | |
|---|---|---|---|
| 2,714,563 | 8/1955 | Poorman et al. | 264/121 |
| 2,965,474 | 12/1960 | Sargent et al. | 75/34 |
| 3,183,077 | 5/1965 | Kraus | 75/10 R |
| 3,726,643 | 4/1973 | Merzhanov et al. | 423/439 |
| 3,848,068 | 11/1974 | Rice | 423/DIG. 10 |
| 4,164,553 | 8/1979 | Perugini et al. | 423/439 |
| 4,221,762 | 9/1980 | Andrjushin et al. | 423/439 |
| 4,468,474 | 8/1984 | Gupta | 423/439 |
| 4,610,857 | 9/1986 | Ogawa et al. | 423/625 |

Primary Examiner—Melvyn J. Andrews
Attorney, Agent, or Firm—Oblon, Fisher, Spivak, McClelland & Maier

[57] ABSTRACT

A process for producing ultra-fine ceramic particles with the particle size of less than 1000 Å, which comprises the steps of forming powdered dust cloud of metal powder such as Si constituting a portion of aimed ceramic particles in a reaction gas containing the other portion of said aimed ceramic particles, igniting said powdered dust cloud to cause explosive burning and synthesizing said aimed ceramic particles and gathering said resulting ceramic particles. By the process, ceramic particles such as $Al_2O_3$, $MgO$, $SiO_2$, $TiO_2$, $TiN$ having particle size of 10-100 nm can be produced.

25 Claims, 3 Drawing Figures

PROCESS FOR PRODUCING ULTRA-FINE CERAMIC PARTICLES

BACKGROUND OF THE INVENTION

1. Field of the Invention

This invention concerns a process for producing ultra-fine ceramic particles utilizing powdered dust explosion.

2. Description of the Prior Art

Ultra-fine ceramic particles with the particle size of less than 1000 Å are of a great surface energy and, accordingly, have an advantage of easy sintering at low temperature and increased catalytic activity, and the mass production of such ultra-fine ceramic particles at a reduced cost has been demanded.

The production process for such ultra-fine ceramic particles are largely classified into the physical process and the chemical process.

The method of producing ultra-fine ceramic particles by using the chemical process includes a vapor phase chemical reaction process utilizing the reaction often employed in chemical vapor deposition process (CVD), for example, as shown in "Production of finely powdered material and technic for the surface improvement" in "Chemical Technology", p 525–529, published in October 1982. As the heat source for the gas phase chemical reaction process, arc, plasma, chemical flame or the like can be used. The chemical flame process includes examples of synthesizing ultra-fine oxide particles from volatiling metal halides by using $H_2$—$O_2$ flame or $C_xH_y$—$O_2$ flame. For instance, ultra high purity silica for use in the matrix of optical fibers is synthetisized by the reaction shown by the following equation:

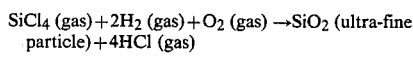
$SiCl_4$ (gas)+$2H_2$ (gas)+$O_2$ (gas) →$SiO_2$ (ultra-fine particle)+$4HCl$ (gas)

In the above-mentioned reaction, silicon tetrachloride ($SiCl_4$), hydrogen ($H_2$) and oxygen ($O_2$) are reacted with each other to form ultra-fine particles of silicon dioxide ($SiO_2$) and hydrogen chloride (HCl). Since silicon tetrachloride itself is expensive and the weight ratio of silicon in the silicon tetrachloride is low, the reaction does not suit to the mass production and also results in a problem that noxious by-products such as hydrogen chloride are resulted.

Furthermore, since the production is carried out in an active atmosphere, it is difficult to obtain clean particle surfaces. These problems are also found in other general chemical processes.

The physical process includes, for example, vacuum vapor deposition process, in which moderate evaporizing phenomenon of substance heated to a high temperature under a reduced pressure is utilized. The process is carried out under a reduced pressure in order to facilitate the evaporization of the starting material. This process, however, consumes a great amount of heat energy, as well as provides a problem in that the production speed is slow and, accordingly, does not suit to the mass production.

SUMMARY OF THE INVENTION

Accordingly, it is the primary object of the present invention to provide a process for producing ultra-fine ceramic particles, which can overcome above-mentioned disadvantages.

It is a further object of the present invention to provide a process for producing ultra-fine ceramic particles with high purity.

It is a further object of the present invention to provide a process for producing ultra-fine ceramics, which has an improved heat efficiency.

It is a further object of the present invention to provide a mass productive process for producing ultra-fine ceramic particles.

The foregoing object can be attained in accordance with this invention by a process for producing ultra-fine ceramic particles which comprises the steps of forming powdered dust cloud composed of metal powder constituting a portion of aimed ultra-fine ceramic particles and a reaction gas containing an element constituting the other portion of the aimed ultra-fine ceramic particles, igniting the powdered dust to cause explosive burning and synthesizing the ultra-fine ceramic particles and collecting the ultra-fine ceramic particles.

As the metal for forming a portion of ultra-fine ceramic particles in this invention, silicon, aluminum, titanium, magnesium, iron, zirconium and the like may be used.

The element constituting the other portion of the aimed ultra-fine ceramic particles for use in this invention includes oxygen, nitrogen, carbon and the like, and reaction gases containing these elements include gaseous oxygen, gaseous nitrogen, gaseous ammonium, hydrocarbons or the likes. By varying the types of the reaction gases, oxides, nitrides and carbides or the likes can be obtained.

For producing the ultra-fine ceramic particles, it is desired that the metal powder reacting with the reaction gases is desirably as fine as possible, preferably, of less than 400 $\mu$m in particle size. Further, it is desired that the metal powder contains impurities as less as possible.

The metal powder and the reaction gas are rendered into so-called powdered dust cloud upon reaction. It is necessary for the powdered dust cloud that it has a density of more than 20 g/m$^3$, usually, more than 500 g/m$^3$ and, more desirably, more than 1000 g/m$^3$ although depending on the type of the metal powder and the reaction gas. No stable ignition can usually obtained unless the density is more than 500 g/m$^3$.

As the heat source for the ignition, it is possible to use such high density energy source as ohmic heating, arc discharge, plasma flame, laser, high frequency induction heating and electron beams. They are used as the seed fire.

Further a chemical flame containing the gaseous element can be efficiently used both as the heat source and the reaction gas especially for producing ltra-fine oxide particles as the ceramic particles.

Namely, the process for producing ultra-fine oxide particles according to the method inwhich a chemical flame is used comprises forming a chemical flame containing oxygen, and feeding into the chemical flame metal powder for constituting a portion of aimed ultra-fine oxide particles in such an amount as capable of forming powdered dust cloud, thereby causing explosive burning and synthesizing the ultra-fine oxide particles.

The reaction of this invention can be carried out under an atmospheric pressure. However, it can also be carried out in an elevated or reduced pressure.

In order to obtain ultra-fine ceramic particles by the explosion of powdered dust, the following two conditions have to be satisfied.

(A) There should be a sufficient heat generation to promote the evaporation of metal and cause explosion of powdered dust after ignition. That is, the reaction enthalpy H should be large.

(B) The reaction product (ultra-fine ceramic particles) should be stable at the reaction temperature, that is, the value T obtained by dividing the temperature $T_0$ (°K.) at the free energy of the product $\Delta G_0 - 0$ with the boiling point $T_1$ (°K.) of the constituent metal of the product should be large (more than 0.6).

FIG. 1 shows plots for various types of ceramics taking $\Delta H_0$ on the abscissa and T on the ordinate. In FIG. 1, ○ represents ceramics formed by the explosion of powdered dust and ● represents ceramics not formed by the explosion of powdered dust, in which constitutional metals with particle size between 200–350 mesh at the concentration of 1000 g/m$^3$ were ignited using reaction gases such as oxygen and nitrogen for investigation.

In FIG. 1, those ceramics situated above the dotted line are obtained by the explosion of powdered dust. As can be seen from FIG. 1, typical ceramics, that is, oxides such as aluminum oxide ($Al_2O_3$), silicon dioxide ($SiO_2$), titanium oxide ($TiO_2$) and zirconium oxide ($ZrO_2$) and nitrides such as titanium nitride (TiN), and zirconium nitride (ZrN) can be synthesized.

As the method for forming a powdered dust cloud, the following methods can be used.

(1) A reaction gas is at first fitted in a vessel and then a metal powder is injected to be dispersed in the reaction gas. In this case, the metal powder may be injected by a pressurized reaction gas.

(2) A metal powder is set in a vessel and then a reaction gas is injected into the vessel to disperse the metal powder.

(3) A pressurized reaction gas containing a metal powder is injected into a vessel to form a powdered dust cloud.

Also as the method for making a chemical flame, oxygen gas is at first filled in a vessel and then by a burner hydrogen gas is continuously burned in the vessel to form a chemical flame containing oxygen. In stead of hydrogen, hydro-carbon ($C_xH_y$) or the like can be burned continuously.

These flames are usually formed by using a burner. The use of the chemical flame as the heat source is free from the defects of the method inwhich a spark discharge is used.

Although the process of utilizing spark discharge for igniting a powdered dust cloud can simplify the structure of the device itself, it has been still somewhat unsatisfactory in that (a) since the high temperature portion forms only a small region, burning can not some time propagate throughout the powdered dust cloud, (b) the burning is only instantaneous and results in only the surface oxidation of the metal powder depending on the case and (c) uniform dispersion of the metal powder is difficult.

Also, the used of the chemical flame can eliminate the following defects in the use of plasma flame;

(a) the initial cost is high due to the facility, (b) a great amount of gas and electric power are consumed and the life of the electrodes is as short as several hundreds hours, to increase the running cost, (c) since the plasma flow rate is so high as exceeding the sonic velocity, it is difficult to feed the metal powder therein and a portion thereof is repelled out and remained not burnt, and (d) since the oxidation is exothermic and caused in a chain-reaction manner, it does not require such high temperature as obtained by the plasma, which means that the heat of plasma is partially spent wastefully.

OPERATION OF THE METHOD IN WHICH A POWDERED DUST CLOUD IS IGNITED

In this method, preferably, a reaction gas is at first filled in a vessel and a metal powder is dispersed in the reaction gas to form a powdered dust cloud at a high concentration (more than 500 g/m$^3$). Then, an adequate ignition source such as arc discharge is actuated and the powdered dust cloud is ignited, whereby heat energy is applied to the surface of the metal powder, the surface temperature of the metal powder is increased and the metal vapor prevails from the surface to the periphery of the metal powder. The metal vapor is mixed with the reaction gas to ignite and produce fire. The heat caused by the fire further promotes the gasification of the metal powder and the metal vapor resulted thereby is mixed with the reaction gas to cause ignition and propagation successively. In this case. the metal powder itself also bursts to scatter and the promote the propagation of the fire. Then, when the resultant gas is cooled spontaneously after the burning, cloud of ultra-fine ceramic particles can be obtained. The ultra-fine ceramic particles thus obtained are collected by being charged in an ordinary electrical dust precipitator or the like.

As described above, the following advantageous effects can be obtained according to the method inwhich a powdered dust cloud is ignited.

(i) Since the heat generated upon reaction of the vapor of metal powder and reaction gas as the starting material promotes the gasification of further metal powder, necessary heat energy to be applied externally may be such a small amount as capable of producing ignition and the heat efficiency is extremely high (more than 100%).

(ii) Since the principle of the powdered dust explosion is utilized, a great amount of ultra-fine ceramic particles can be obtained instantaneously to provide high mass productivity.

(iii) Since the process according to this invention can be carried out under an atmospheric temperature, the structure of the apparatus can be simplified and the cost can be reduced as compared with the conventional process.

(iv) By increasing the purity of the metal powder and the reaction gas as the starting material, ultra-fine ceramic particles at a high purity and having clean surfaces can be produced.

(v) Since the production step is relatively simple, the process can easily be automated.

OPERATION OF THE METHOD IN WHICH A CHEMICAL FLAME IS USED

In the method, preferably, a gas containing oxygen as the reaction gas is at first filled in a vessel and a hydrogen gas is burned through a burner so that a chemical flame is formed in the reaction gas. Then, metal powder is supplied into the chemical flame to form powdered dust cloud at high density (more than 500 g/m$^3$). Then, heat energy is applied to the surface of the metal powder by the chemical flame, whereby the surface temperature of the metal powder is increased and the vapor of metal prevails from the surface to the periphery of the metal powder. The metal vapor reacts with the oxygen gas to cause ignition and the result in fire. The heat caused by the fire further promotes the gasification of the metal powder, the metal vapor formed thereby and the reaction gas are mixed to cause chain-like ignition and propagation. In this case, the metal powder itself also bursts to scatter and promote the propagation of the fire. Then, when the resultant gas is spontaneously cooled after the combustion, a cloud of ultra-fine oxide particles is formed. The ultra-fine oxide particles thus formed are collected by being charged with an ordinally electrical dust precipitator or the like.

As described above, according to the method in-which a chemical flame is used, the following advantageous effects can be obtained:

(i) since the heat generated upon reaction of the evaporized metal powder and the reaction gas as the starting material promotes the gasification of metal powder in other portions, necessary heat energy applied externally can be such an extremely small amount as capable of causing ignition and the heat efficiency is very much high (more than 100%), (ii) since the principle of the powdered dust explosion is utilized, a great amount of ultra-fine oxide particles can be obtained instantaneously to provide a high mass productivity, (iii) since the chemical flame is used as the heat source, mis-firing and incomplete combustion can be prevented to provide completely ultra-fine oxide particles, (iv) since the metal powder can easily be fed into the chemical flame and the temperature near the exit of the burner is low, no melting and clogging of metal powder are caused as in the case of using the plasma, (v) since the flow velocity is lower than that of the plasma, the metal powder can stay for a longer time than in the case of the plasma in a high temperature region of the combustible substance forming the chemical flame, and (vi) since the production step is relatively simple the process can easily be automated.

BRIEF DESCRIPTION OF THE DRAWINGS

The present invention will now be shown and described with reference to several preferred examples of the method and of the apparatus thereof, and with reference to the illustrative drawings. It should be clearly understood, however, that the description of the preferred examples, and the drawings, are all of them given purely for the purposes of explanation and exemplification only, and are none of them intended to be limitaive of the scope of the appended claims. In the drawings, like parts and features are denoted by like reference symbols in the figures thereof, and:

EXAMPLES

Figure 1:
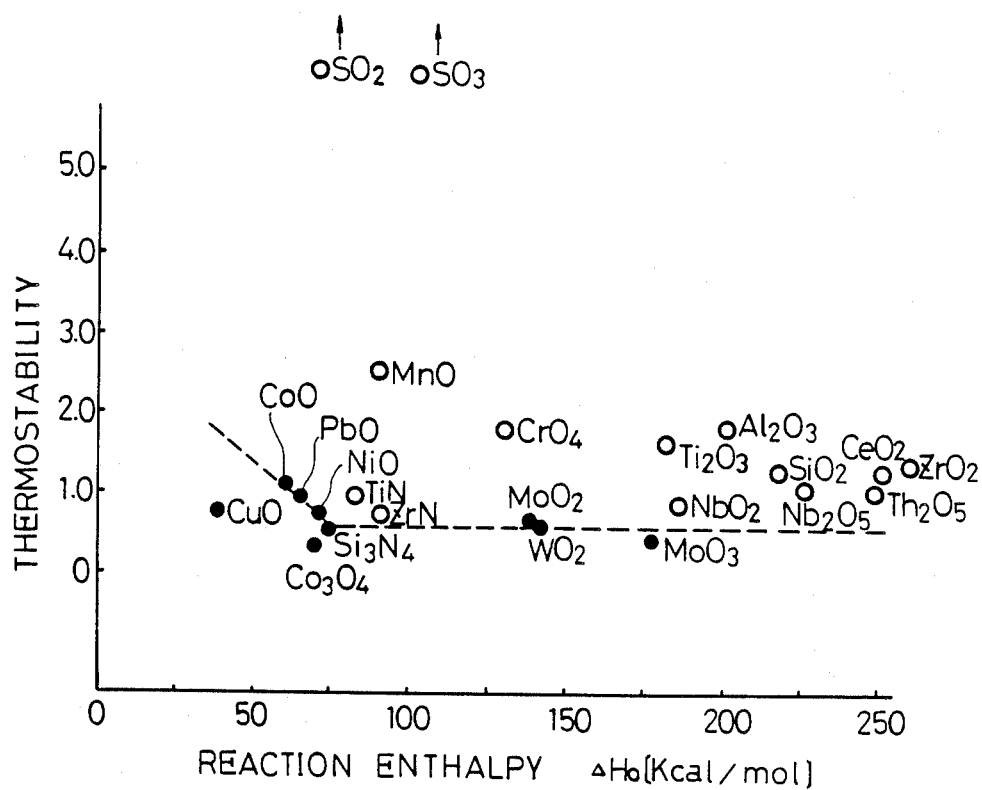
FIG. 1 is a graph showing the result of the investigation for the possibility of forming various kinds of ultra-fine ceramic particles due to the powdered dust explosion.

Next, example of this invention will be described referring to the drawing.

EXAMPLE 1

The first example shows a case for producing ultra-fine oxide particles as the ultra-fine ceramic particles.

Figure 2:
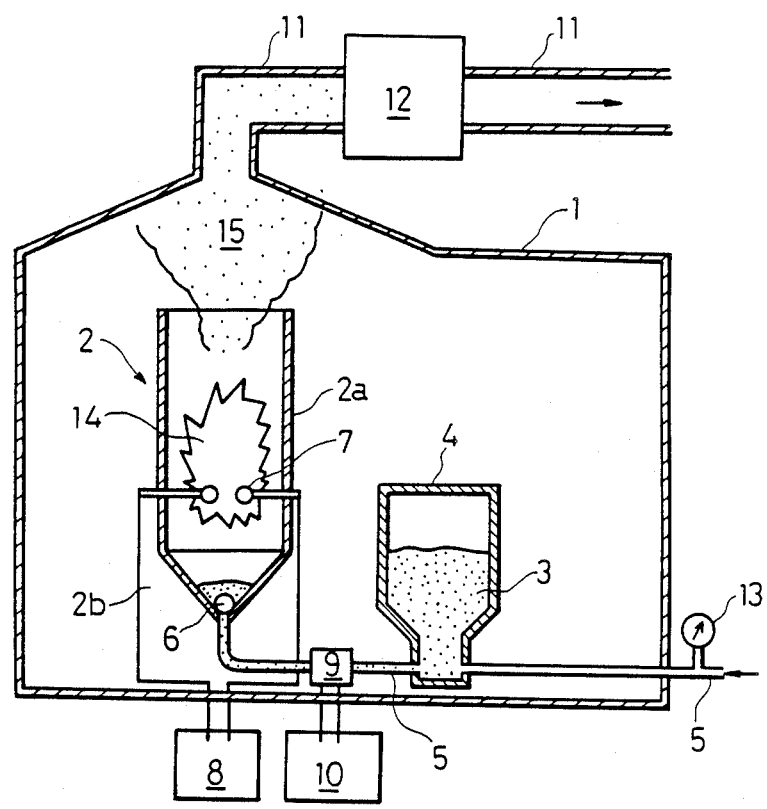
FIG. 2 is schematic structural view showing the outline of the device for producing ultra-fine ceramic particles employed in the examples according to this invention.

FIG. 2 is a schematic constitutional view showing the outline of the device for producing ultra-fine ceramic particles used in the first example according to this invention.

In FIG. 2, reference numeral 1 denotes a tightly closed vessel forming an outer casing for the device for producing ultra-fine ceramic particles and a combustion device 2 and a hopper 4 for supplying metal powder 3 are disposed within the tightly closed vessel 1. The combustion device 2 and the hopper 4 are connected by means of a feedpipe 5 and the hopper 4 is further connected with an external reaction gas supply source (not illustrated) by means of a feedpipe 5.

The combustion device 2 comprises a cylindrical portion 2a and a conical portion 2b made of quartz, in which a ball valve 6 made of alumina is inserted to the connection portion between the conical portion 2b and the feedpipe 5. Further, a pair of discharge electrodes 7 are opposed with a predetrermined gap at the cylindrical portion 2a of the combustion device 2, and the discharge electrodes 7 are connected to a high voltage transformer 8.

Further, a solenoid valve 9 is disposed at the midway of the feedpipe 5 for connecting the hopper 4 with the combustion device 2, and the solenoid valve 9 is controlled to open and close by a control device 10.

Above the combustion device 2 in the tightly closed vessel, is attached an exhaust pipe 11 and an electrical dust precipitator 12 is mounted at the midway of the exhaust pipe 11. Reference numeral 13 denotes a pressure gage.

Fine oxide particles were produced by using such a ultra-fine ceramic particle producing device.

The metal powder 3 as the starting material was at first charged in the hopper 4. Then, clean air is filled to the inside of the tightly closed vessel 1. Subequently, the bottom of the hopper 4 is opened and air as the reaction gas from a reaction gas supply source not illustrated is supplied under the pressure of 5 kg/m². In this case, the solenoid valve 9 is closed by the control device 10. While on the other hand, 10 KV (AC) of voltage is applied from the high voltage transformer 8 with the electrode gap between the discharge electrodes 7 being set to 2 mm. As the result, sparks are always generated between the discharge electrodes 7. Under such a condition, the solenoid valve 9 was opened for 0.5 sec. Then, the metal powder 3 was supplied carried on the pressurized air to the conical portion 2b of the combustion device 2, raised the ball valve 6 and formed powdered dust cloud comprising the metal powder 3 while being scattered upwardly to the inside of the combustion device 2. The powdered dust cloud was ignited by the sparks being generated between the discharge electrodes 7 to instantaeously from a combustion flame 14 and, thereafter, spontaneously cooled to form a cloud 15 of the ultra-fine oxide particles. The ultra-fine oxide particles were collected in the electrical dust precipitator 12 and the remaining gases were exhausted through the exhaust pipe 11.

Such ultra-fine oxide particles were produced while varying the materials for the metal powder as shown in the Table 1 below. The ultra-fine oxide particles obtained as the result were observed by a transmission type electron microscope (TEM) to examine the particle size, configuration and crystallinity. The results are also shown in Table 1.

As apparent also from Table 1, it can be seen that ultra-fine oxide particles of sphere or spheric polyhedron with particle size of between 5-100 nm can be obtained by the present example.

EXAMPLE 2

Ultra-fine nitride particles were produced by using the same device as in the first example shown in FIG. 2.

The second example was different from the first example in that purified nitrogen gas (99.99%) was introduced up to an atmospheric pressure after evacuating the inside of the tightly closed vessel to more than 10 Torr of vacuum degree, in that an ammonia gas is used as the reaction gas with a gas pressure of 3 kg/cm$^2$ and in that the metal powder as the starting material was heated by heating the feedpipe up to 600° C. by ohmic heating, and ultra-fine nitride particles were produced substantially in the same manner as in the first example with respect to other procedures.

Such ultra-fine nitride particles were produced while varying the materials for the metal powder as shown in Table 2 listed below. The ultra-fine nitride particles obtained as the result were observed by a transmission type electron microscope (TEM) to examine the particle size, configuration and crystallinity. The results are also shown in Table 2.

As apparent from Table 2, it can been that ultra-fine nitride particles of sphere or spheric polyhedron with particle size of between 5-100 nm could be obtained.

TABLE 1

| Synthesized ultra-fine particle | Particle size (nm) | Configuration | Crystallinity | Starting material |
|---|---|---|---|---|
| Al$_2$O$_3$ | 10-100 | Sphere | crystalline | Al 99.9% less than 200 mesh |
| MgO | 10-100 | ↑ | ↑ | Mg 98.0% less than 200 mesh |
| SiO$_2$ | 8-50 | ↑ | amorphous | Si 98.0% less than 150 mesh |
| TiO$_2$ | 10-100 | ↑ | crystalline | Ti 99.5% less than 350 mesh |
| ZrO$_2$ | 10-100 | ↑ | ↑ | Zr 98.0% less than 350 mesh |
| Fe$_3$O$_4$ | 5-70 | spheric polyhedron | ↑ ↑ | Fe 99.9% less than 200 mesh |

TABLE 2

| Synthesized ultra-fine particle | Particle size (nm) | Configuration | Crystallinity | Starting material |
|---|---|---|---|---|
| TiN | 10-100 | sphere | crystalline | Ti 99.5% less than 350 mesh |
| ZrN | ↑ | ↑ | ↑ | Zr 98.0% less than 350 mesh |

EXAMPLE 3

Figure 3:
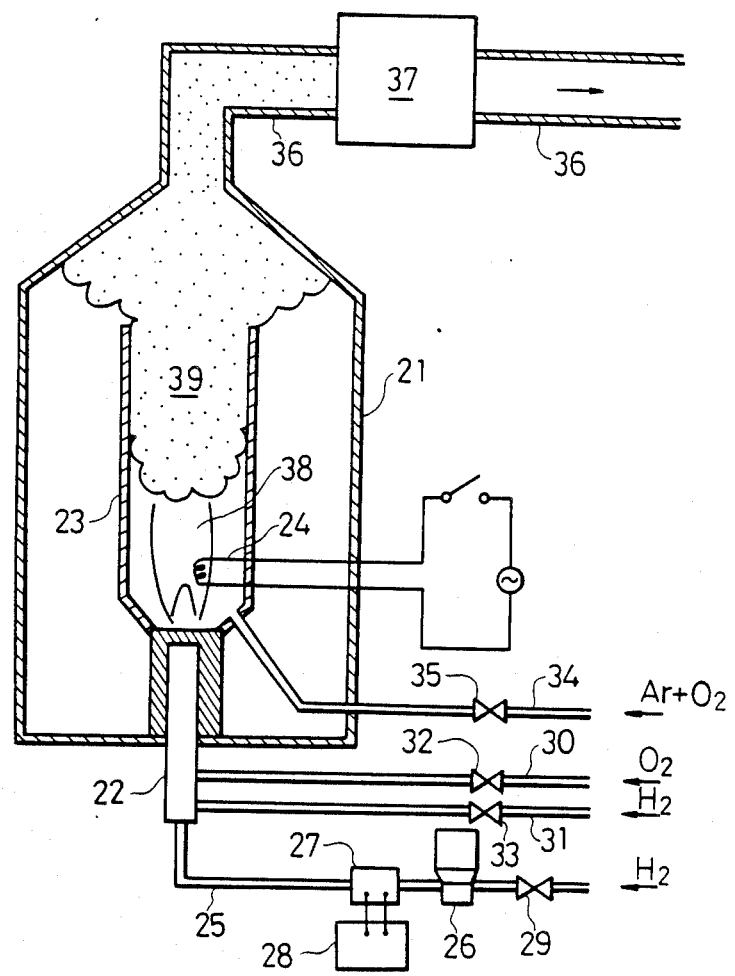
FIG. 3 is a schematic constitutional view or showing the outline of a device for producing ultra-fine oxide particles employed in the example of this invention.

FIG. 3 is a schematic structural view showing the outline of a device for producing ultra-fine oxide particles employed in the third example of this invention.

In the drawing, reference numeral 21 denotes a tightly closed vessel forming the outer casing of a device for producing ultra-fine oxide particles, and a gas burner 22 is atached at the bottom of the tightly closed vessel 21. At the top end of the gas burner 22, is mounted a combustion cylinder 23 made of quartz and the top end of an ignition device 24 is attached near the exit of the gas burner 22 in the combustion cylinder 23.

The inside of the gas burner 22 is substantially structured as a double walled pipe, in which the inner space is communicated with one end of an introduction pipe 25. A hopper 26 for supplying metal powder is disposed at the midway of the introduction pipe 25 and a ball value 27 is disposed to introduction pipe 25 between the hopper 26 and the gas burner 22. The ball valve 27 is controlled to open and close by a control device 28. The introduction pipe 25 is connected at the ther end thereof to a hydrogen supply source of the hydrogen is controlled by a value 29.

To the outer space in the gas burner 22, are opened respective one ends of a first gas pipe 30 and a second gas pipe 31 with the other end of the first gas pipe 30 being connected with an oxygen supply source and the other end of the second gas pipe 31 being connected to a hydrogen supply source. The amount of the respective gases are controlled by means of valves 32 and 33 respectively.

A third gas pipe 34 opens at one end thereof to the inside of the combustion cylinder 23 and communicates at the other end thereof with an argon and oxygen aupply source, in which the amount of the gas is controlled by a valve 35.

Further, to an upper portion of the tightly closed vessel 21 situated above the combustion cylinder 23 is attached an exhaust pipe 36, and an electrical dust precipitator 37 is mounted at the midway of the exhaust pipe 36.

Ultra-fine oxide particle were produced by using such a device for producing ultra-fine oxide particles.

At first, metal power as the starting material is charged in the hopper 26. Then, the valve 35 was opened to introduce a gas mixture of argon and oxygen by way of the third gas pipe 34 to the inside of the tightly closed vessel 21 to replace the atmospheric air therein. The volume ratio between the argon gas and the oxygeb was 4:1. Subsequently, valves 32 and 33 were opened to supply oxygen from the first gas pipe 30 at 20 l/min and hydrogen from the second gas pipe 31 at 10 l/min to the gas burner 22, and ignited by the ignition device 24 to form a combustion flame comprising flame comprising an oxygen - hydrogen flame.

Then, the bottom of the hopper 26 was opened and the metal powder was supplied to the gas burner 22 while being carried on the hydrogen at a pressure of 1 kg/cm$^2$ by opening the valve 29 while opening and closing the ball valve 27 at 0.5 sec interval by the control device 28. Then, the metal powder scattered upwardly from the exit of the gas burner 22 to form a powdered dust cloud. The powdered dust cloud was ignited by the combustion flame 38 to obtain a great amount of ultra-fine oxide particles through the explosive burning. The cloud 39 of the ultra-fine oxide particles produced through the synthesis was passed to the electrical dust precipitator 37 to collect the ultra-fine oxide particles.

Such ultra-fine oxide particles were produced while varying the materials for the metal powder as shown in Table 1 listed below. The ultra-fine oxide particles obtained as the result were observed under a transmission type electron microscope (TEM) to examine the particle size and configuration and crystallinity. The results are also shown in Table 3.

As apparent from Table 3, it can be seen that the ultra-fine oxide particles with the particles size of between 5-100 nm can be obtained according to this example, in the shape of sphere or spheric polyhedron.

Furthermore, the rate of synthesis was increased by more than 30% as compared with that produced through the electric discharge ignition as described above.

While this invention has been described with respect to the specific example, this invention is no way limited only thereto but various embodiments are encompassed within the scope of the claim.

For instance, while the process for producing ultra-fine oxide particles and ultra-fine nitride particles have been described in the foregoing examples, this invention can of course be applied to ultra-fine carbide particles.

TABLE 3

| Synthesized ultra-fine particle | Particle size (nm) | Configuration | Crystallinity | Starting material |
| --- | --- | --- | --- | --- |
| $Al_2O_3$ | 10-100 | sphere | crystalline | Al 99.9% less than 200 mesh |
| MgO | 10-100 | ↑ | ↑ | Mg 98.0% less than 200 mesh |
| $SiO_2$ | 8-50 | ↑ | amorphous | Si 98.0% less than 150 mesh |
| $TiO_2$ | 10-100 | ↑ | crystalline | Ti 99.5% less than 350 mesh |
| $ZrO_2$ | 10-100 | ↑ | ↑ | Zr 98.0% less than 350 mesh |
| $Fe_3O_4$ | 5-70 | spheric polyhedron | ↑ | Fe 99.9% less than 200 mesh |

What is claimed is:

1. A process for producing ultra-fine ceramic particles which comprises:
   (a) forming a powdered dust cloud composed of metal powder and a reaction gas containing an element for reaction with said metal powder,
   (b) igniting the same to cause explosive burning and synthesizing the ultra-fine ceramic particles, and
   (c) gathering said ultra-fine ceramic particles; and wherein the reaction enthalpy, $\Delta H_0$, is sufficiently large to generate sufficient heat to evaporate the metal, thereby causing an explosion of the powdered dust after ignition, and wherein the value T, which is the value obtained by dividing the temperature $T_0(°K.)$ at the free energy of th product $\Delta G_0$-0 by the boiling point $T_1(°K.)$ of the constituent metal of the product, is greater than 0.6, indicating that the reaction product is stable at the reaction temperature.

2. The process according to claim 1, wherein the metal forming said metal powder is one selected from the group consisting of silicon, aluminum, titanium, magnesium, zirconium, iron or a mixture thereof.

3. The process according to claim 1, wherein the particle size of said metal powder is less than 400 μm.

4. The process according to claim 1, wherein the density of said metal powder in said powdered dust cloud is more than 20 g/m³.

5. The process according to claim 4, wherein the density of said metal powder in said powdered dust cloud is more than 500 g/m³.

6. The process according to claim 5, wherein the density of said metal powder in said powdered dust cloud is more than 1000 g/m3.

7. The process according to claim 1, wherein said element is one selected from the group consisting of oxygen, nitrogen, and carbon.

8. The process according to claim 1, wherein said reaction gas is one selected from the group consisting of gaseous oxygen, gaseous nitrogen, gaseous ammonium, gaseous hydrocarbon or a mixture thereof.

9. The process according to claim 1, wherein the step of igniting is carried out by ohmic heating.

10. The process according to claim 1, wherein the step of igniting is carried out by arc discharge.

11. The process according to claim 1, wherein the step of igniting is carried out by plasma flame.

12. The process according to claim 1, wherein the step of igniting is carried out by laser.

13. The process according to claim 1, wherein the step of igniting is carried out by high frequency inducting heating.

14. A process according to claim 1, wherein the step of igniting is carried out by electron beams.

15. The process according to claim 1, wherein said ultra-fine ceramic particles have a particle size of less than 1000 Å.

16. The process according to claim 15, wherein said ultra-fine ceramic particles have a particle size of about 10-100 nm.

17. A process for producing ultra-fine oxide particles, which comprises:
   (a) forming a chemical flame containing gaseous oxygen;
   (b) feeding metal powder into said chemical flame to explosively burn said metal powder and to synthesize the ultra-fine oxide particles; and
   (c) gathering ultra-fine oxide particles; and wherein the reaction enthalpy, $\Delta H_0$, is sufficiently large to generate sufficient heat to evaporate the metal, thereby causing an explosion of the powdered dust after ignition, and wherein the value T, which is the value obtained by dividing the temperature $T_0$ (°K.) at the free energy of the product $\Delta G_0$-0 by the boiling point $T_1$ (°K.) of the constituent metal of the product, is greater than 0.6, indicating that the reaction product is stable at the reaction temperature.

18. The process according to claim 17, wherein the step of forming a chemical flame comprises filing a vessel with hydrogen and burning the same in said vessel by a burner to form the resulting chemical flame.

19. The process according to claim 17, wherein the metal forming said metal powder is one selected from the group consisting of silicon, aluminum, titanium, magnesium, zirconium, iron and the mixture thereof.

20. The process according to claim 17, wherein the particle size of said metal powder is less than 400 μm.

21. The process according to claim 17, wherein the density of said metal powder in said powdered dust cloud is more than 20 g/m³.

22. The process according to claim 21, wherein the density of said metal powder in said powdered dust cloud is more than 500 g/m³.

23. The process according to claim 22, wherein the density of said metal powder in said powdered dust cloud is more than 1000 g/m³.

24. The process according to claim 17, wherein said ultra-fine oxide particles have a particles have a particle size of less than 1000 Å.

25. The process according to claim 24, wherein said ultra-fine oxide particles have a particle size of about 10–100 nm.

* * * * *